Dec. 22, 1931.        P. WOLF        1,837,438
APPARATUS FOR WASHING COALS
Filed Dec. 5, 1927        3 Sheets-Sheet 1
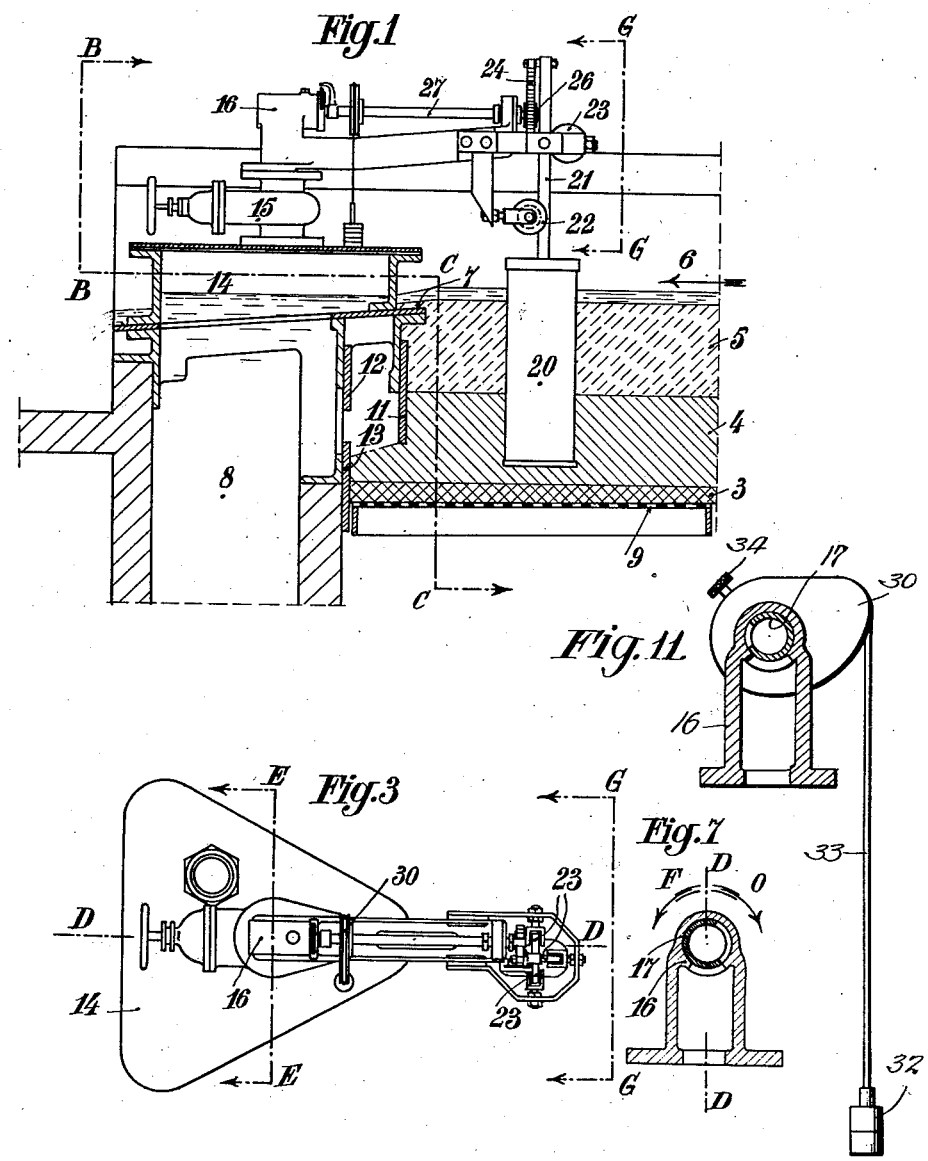

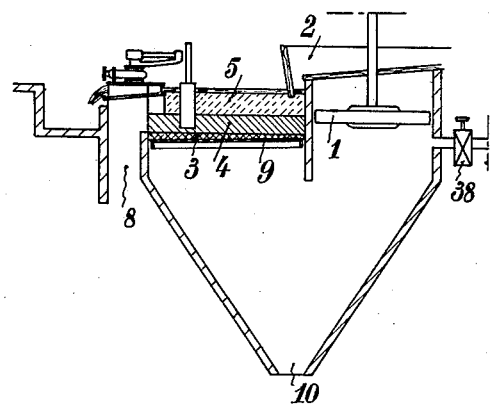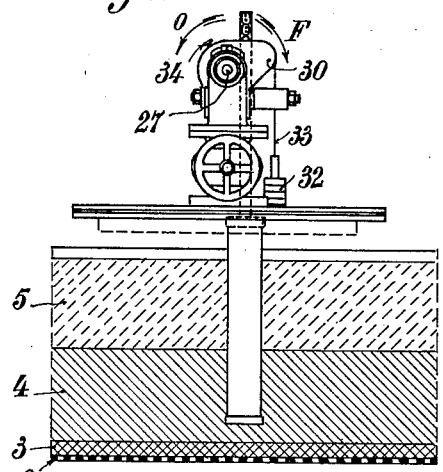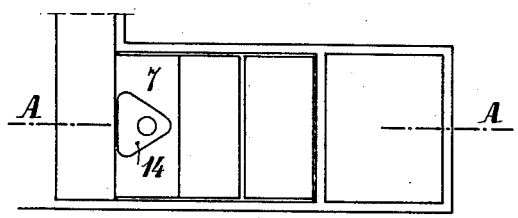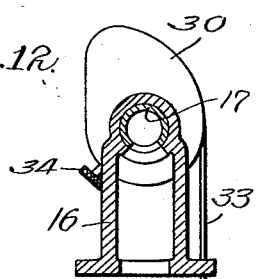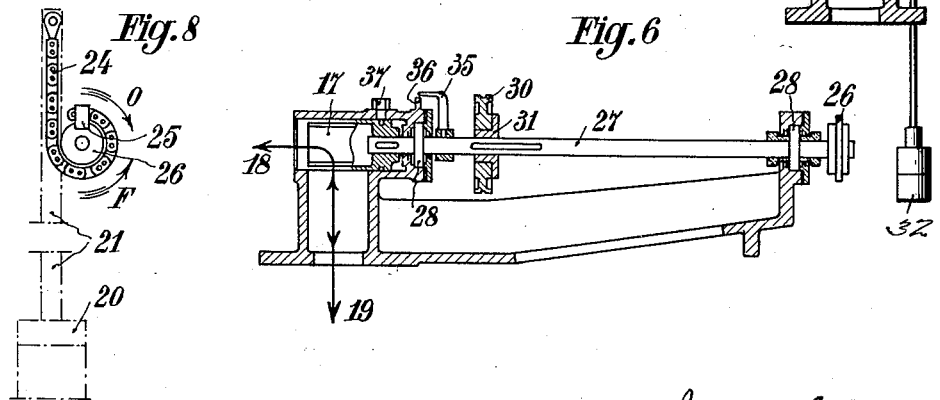

Inventor
Philippe Wolf
By Edward C. Sasnett
Atty.

Patented Dec. 22, 1931

1,837,438

UNITED STATES PATENT OFFICE

PHILIPPE WOLF, OF PARIS, FRANCE

APPARATUS FOR WASHING COALS

Application filed December 5, 1927, Serial No. 237,864, and in France December 31, 1926.

The present invention relates to modifications in the apparatus forming the subject of my Patent No. 1,682,820, granted Sept. 4, 1928, and more particularly to the application of such apparatus to felspar vats.

In practice it has been found that the devices forming the subject of the said specification, whilst giving excellent results when applied to vats for granular coal, do not give satisfactory results when applied to felspar vats, the weight of the bed of feldspar, which is very important relatively to that of the bed of schist and coal, overcoming the variations in the weight of the bed of schist upon which the variations of the course of the float which controls the apparatus are based.

The present modifications are illustrated by way of example in the annexed drawings in which:

Fig. 1 is a section on a large scale taken on the line A—A of Fig. 5 of the regulating apparatus;

Fig. 2 is a part elevation, part section, the section being on line C—C of Fig. 1.

Fig. 3 is a plan of Fig. 1;

Fig. 4 is a general sectional view of a felspar washing vat which supports the apparatus, this section being taken on the line A—A of Fig. 5;

Fig. 5 is a plan of Fig. 4;

Fig. 6 is a section on the line D—D of Figs. 3 and 7;

Fig. 7 is a section on the line E—E of Fig. 3;

Fig. 8 is an end view of the control chain of the apparatus on line G—G of Fig. 3;

Figures 11 and 12 are sectional detailed views illustrating a cylindrical slide valve and controlling mechanism associated therewith.

Figure 9:
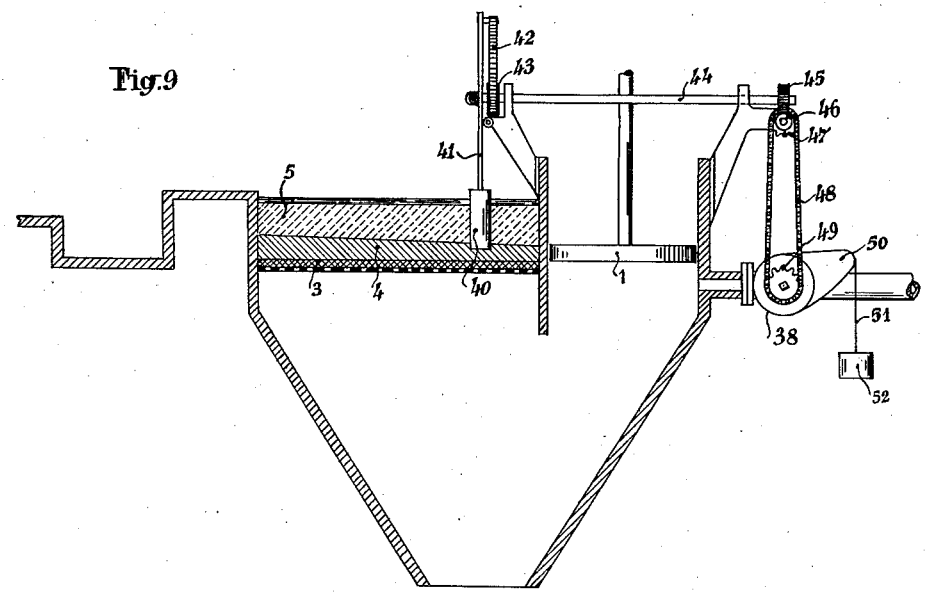
Figs. 9 and 10 are sections, on a larger scale, showing a washing vat provided with means for automatic water control.

In the washing vat shown in Fig. 4 the pulsations are produced by a piston 1 operated by eccentrics or by other mechanism such as is normally employed. These pulsations may be also produced by compressed air or by water under pressure. The coarse products are conveyed into the washing vat by means of the chute 2. Owing to the pulsations the coarse products rest on the bed of felspar 3 and are separated into a layer of schist 4 and a layer of coal 5. The washing bed is displaced in the direction of the arrow 6, in proportion as the coal is evacuated above the sill 7 and as a part of the schist is forced into the evacuation chamber 8. A part only of the schist is evacuated into this chamber because, whilst the schist is displaced above the washing table 9 which supports the bed of felspar, a certain quantity of this schist traverses the felspar 3 and the metal gauze of the washing table 9 and is evacuated through the opening 10 formed in the lower part of the vat. The schist evacuated into the chamber 8 and through the opening 10 can be recovered by any suitable means. The quantity of schist evacuated across the bed of felspar is constant and represents about half the maximum output of schist; the other half of this output is evacuated through the chamber 8. It will thus be seen that in controlling the quantity of schist passing into the chamber 8 from a maximum output to nil, the total quantity of schist evacuated can be varied from a maximum output to half the latter. In order to reach the chamber 8 the schist is caused to pass below the plate 11 and between the plates 12 and 13, which are adjustable as to their height. As shown in Fig. 1, the members 11 and 13 are disposed in such manner that the schist forms a slope which does not become displaced statically. Above the evacuation chamber 8 is located the compression chamber 14 bolted to the sill 7 and arranged in such manner that the washed coal 5, which is displaced by a stream of water, passes above the sill 7 and on both sides of this compression chamber. A casing 16 is mounted on the latter through the medium of a container 15 and a slide 17 is movably disposed within the slide valve, such slide allowing communication between the compression chamber 14 and the atmosphere to be opened or closed. If the valve 16 is opened when the washing vat is functioning, the air can enter and leave as shown by the arrows 18 and 19 (Fig. 6), and the water can rise and fall in the compression chamber 14 in accordance with the movements of the piston 1. This water passes between the plates 11 and 13 produces the flow which displaces to the chamber 8 the bank of schist situated between these two plates and thus causes its evacuation into this chamber 8. On the other hand, when the slide 17 closes the valve 16, the air above the water in the compression chamber 14 opposes any displacement of this water due to the pulsations, thus eliminating the flow between the plates 11 and 13 and preventing the evacuation of the schist. It is therefore necessary to regulate the position of the slide 17 automatically in accordance with the quantity of schist to be evacuated in order to regulate the operation of the washing vat automatically. The regulation of the position of the slide 17 is effected as follows:

The fine products which are less than 10 mm. in diameter, the schist 4 and coal 5 which are arranged in a graded manner above the felspar 3, and which are subjected to the agitations created by the pulsations of high frequency and small amplitude caused by the movements of the piston 1, remain as it were in suspension in the water and behave up to a certain point as fluids having a density greater than that of the water, the density of the layer of schist 4 being greater than that of the layer of coal 5.

If a float 20 of suitable form be inserted in the superposed layers of the two fluids 4 and 5, the float will assume a position of equilibrium, which is dependent upon the relative thicknesses of the layers 4 and 5 of which the total thickness is constant. When the thickness of the layer 4 increases, the float 20 rises; when on the other hand it decreases, the float sinks. The float is preferably cylindrical in shape.

The float 20 is secured to the end of a square rod 21. It is guided by a series of fixed rollers 22 and 23 which only allow it axial movement. A chain 24 is secured on the one hand to the end of the rod 21 and on the other hand by means of a suitable block 25 to the circumference of the toothed wheel 26, with which the chain engages. This toothed wheel is keyed to the end of an axle 27 which carries the slide 17 at its other end. This rod 27 is mounted on rollers 28 and 29. It carries on the other hand a cam 30 of which the position can be modified relatively to the rod 27 for the purpose of adjustment at the moment when the apparatus is put into operation, and this can be done by any suitable means. Figures 11 and 12 clearly illustrate the cam 30 in two positions, an opened position and a closed position, respectively. The counter-weight 32 acts on this cam 30 by means of a rope 33 which is fixed by means of a screw 34 to the part of the cam which is concentric with the axle 27. The counter-weight 32 tends to displace the latter in the direction of the arrow F (Figs. 2, 7 and 8); it thus tends to cause the float 20 to sink through the medium of the pinion 26 and the chain 24.

On the other hand the position of the cam 30 shown in Fig. 2 corresponds to the positions of the slide 17 and the wheel 26 shown in Figs. 7 and 8. The positions of these different elements are based on the assumption that the layer of schist 4 is very thin and that the float 20 is at the lower end of its path. In this case the slide 17, whilst closing communication between the compression chamber 14 and the atmosphere, interrupts evacuation of the schist into the evacuation chamber 8 (Fig. 7). At this moment the schist is no longer evacuated across the feldspar, and as this output is almost half the maximum output, whilst the output of schist reaching the washing apparatus hardly ever reaches a value as small, so that the thickness of the bed of schist 4 increases, which tends to cause the float 20 to rise and to displace the slide 17 and the cam 30 in the direction of the arrow O by means of the chain 24 and the pinion 26; but, in this displacement in the direction of the arrow O, the radius of the cam 30, through the medium of which the counter-weight 32 acts, decreases, the effect of which is to reduce the force which opposes the rise of the float 20 and corresponds, in fact, to a reduction of the latter. This device increases the movement which the float 20 would have carried out if it had been subjected to a constant force tending to direct it outwardly in the washing bed. The whole movement thus takes place as if the weight of the float 20 had been decreased, when it was travelling upwards, and, on the other hand, increased, when it was travelling downwards.

This device has the advantage of increasing the displacement of the float 20 which would otherwise have been distinctly small, substantially a few centimetres only, between the moment at which the thickness of the bed of schist was a maximum and that at which it was a minimum. The fact that the whole washing bed is subjected to continuous pulsations causes a parallel pulsatory movement of the float 20, thus avoiding any danger of jamming in spite of the fact that the forces involved are small. The continuous reciprocation of the float 20 is so small that it does not involve opening of the valve 16 when the latter is closed, nor its closing when it is open. A pointer 35 is mounted on the axle 27 and moves across a sector 36 in order to indicate to the operator at any given moment the state of the washing bed.

The slide 17 is mounted with little friction at one end of the axle 27. It is held in place by means of the nut 37 which is provided with a projection which engages a corresponding groove in the slide 17. It is only necessary slightly to unscrew the nut 37 in order to enable the slide 17 to be removed for cleaning or lubricating purposes.

The contrivances described are applicable to felspar vats in which a portion of the schist is evacuated across the bed of felspar and another portion by means of the rear sill.

In the case of felspar vats in which all the schist is evacuated across the bed of felspar the evacuation chamber 8 is eliminated. Adjustment is then effected as follows:

An adjustable water inlet 38 is mounted either below or above the piston 1. Experience has shown that when the output of water introduced by means of this inlet 38 is increased the quantity of material evacuated across the bed of felspar increases in like manner. On the other hand, when the flow of water through the inlet 38 decreases, the quantity of schist evacuated decreases proportionately and becomes almost nil when the flow of water through the inlet 38 is cut off. The automatic control of the water inlet 38 is shown in Fig. 9 and is similar to that of the air valve 16. A float 40 inserted in the superposed layers 4 and 5 is secured to the end of a rod 41. A chain 42 is secured at one end to the end of rod 41 and at the other end to a wheel 43 which is keyed on the end of a shaft 44. The rotation of the shaft is transmitted by means of a wheel 45, a worm 46, a wheel 47, a chain 48, and a wheel 49, to a valve 38. The shaft of valve 38 carries a cam 50 of the same shape as cam 30, previously referred to. A rope 51 secured to the cam and rolling over the latter carries a counterweight 52. When the thickness of the washing bed increases, float 40 rises and opens valve 38, thus increasing the output of the water inlet. Valve 38 is moved to closing position by the counterweight 52.

Figure 10:
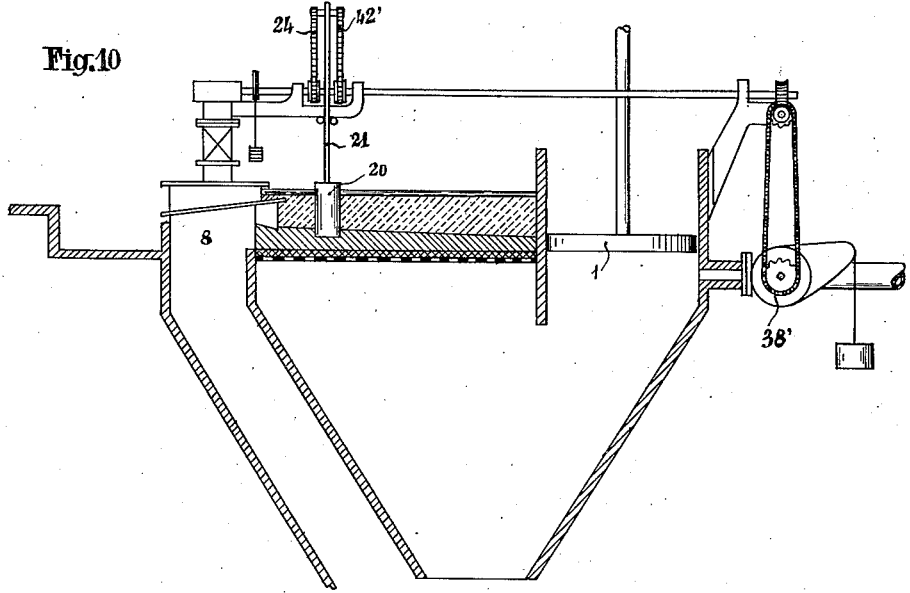

Both the evacuations, in the case of apparatus with partial evacuation across the felspar, and partially into a rear evacuation chamber 8, could be controlled at the same time by the float 20, the evacuation into the chamber 8 by means of an air valve 16 actuated by chain 24 and the evacuation across the felspar by means of valve 38' actuated by chain 42' (see Fig. 10) acting as the chain 42 in Fig. 9, both chains 42' and 24 being secured on each side of the end of rod 21 of float 20.

It can be seen in the latter case that, if the products to be washed contain schist, mixed material and coal, evacuation of the schist across the felspar and the evacuation of the mixed material into the rear evacuation chamber 8 can be automatically regulated.

What I claim is:

1. In an apparatus for washing fine coals, the combination with a vat having a bed of feldspar and provided with a suitable pistoning, of an automatic control device for the evacuation of the schist, which device comprises a float located within the bed of fine coals above the bed of feldspar, the vertical position of said float being dependent upon the average density of the washing bed, said vat having a compartment for the evacuation of the schist and having a compression chamber located above said compartment, a rotary valve controlling communication between said compression chamber and the atmosphere, a rod secured to said float, a toothed wheel on the shaft of said valve, a chain connecting said rod and wheel so as to move the valve towards open position when the float rises, a lever arm secured to said valve shaft, and a counter weight connected to said lever arm to move the valve towards closed position as the float falls, whereby the evacuation of the schist is in direct proportion to the average density of the washing bed and consequently of the schist to be evacuated.

2. In an apparatus for washing fine coals, the combination with a vat having a jigging bed and provided with a suitable pistoning, of an automatic control device for the evacuation of the schist, which device comprises a float located within the bed of fine coals above the bed of feldspar, the vertical position of said float being dependent upon the average density of the washing bed, said vat having a compartment for the evacuation of the schist and having a compression chamber located above said compartment, a rotary valve controlling communication between said compression chamber and the atmosphere, a rod secured to said float, a toothed wheel on the shaft of said valve, a chain connecting said rod and wheel so as to move the valve towards open position when the float rises, a variable lever arm constituted by a cam secured to said valve shaft, a counterweight carried by a rope secured to the cam and rolling over the latter, said cam having a profile such that the leverage is greater in the position corresponding to the closing of the valve and is smaller in the position corresponding to the opening of the valve.

In testimony whereof I hereunto affix my signature.

PHILIPPE WOLF.